June 20, 1933.  C. W. STONE  1,915,074
ELECTRIC DISTRIBUTION SYSTEM
Filed April 17, 1931
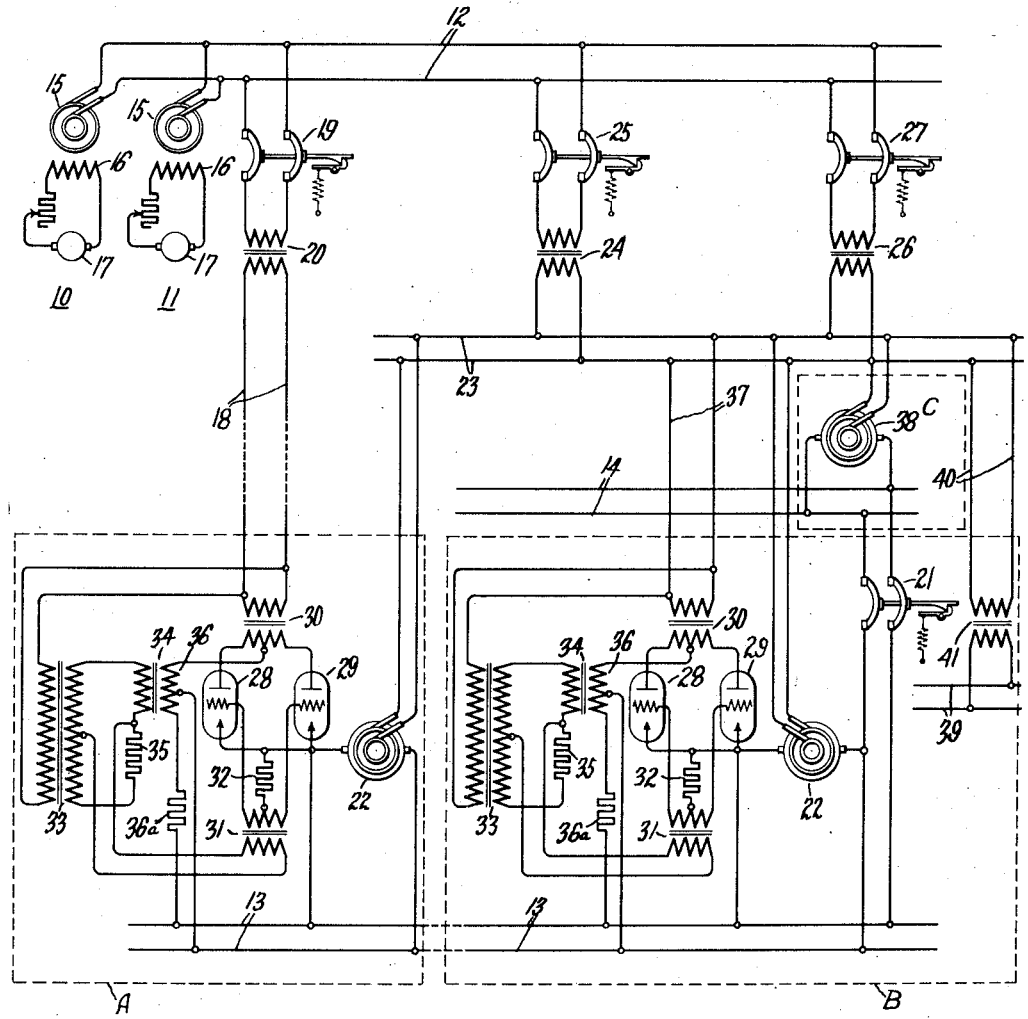
Inventor:
Charles W. Stone,
by Charles E. Tullar
His Attorney.

Patented June 20, 1933

1,915,074

UNITED STATES PATENT OFFICE

CHARLES W. STONE, OF SCHENECTADY, NEW YORK, ASSIGNOR TO GENERAL ELECTRIC COMPANY, A CORPORATION OF NEW YORK

ELECTRIC DISTRIBUTION SYSTEM

Application filed April 17, 1931. Serial No. 530,882.

My invention relates to systems of electrical distribution and more particularly to such systems utilized to transmit energy from one or more generating stations to a highly concentrated direct current load circuit, such, for example, as are found in many of the metropolitan areas of this country.

In most of the larger cities of this country, electrical energy is transmitted from alternating current generating stations located on the outskirts of the city to an alternating current distribution system which covers the residential areas of the city, and to a direct current distribution system coextensive with the congested business districts of the city. Energy is usually conducted from one or a number of these generating stations to a number of substations economically distributed with respect to the load centers of the business districts where it is transformed to lower voltage and converted to direct current by means of synchronous converters or motor generators. In many instances the load of a single office building is sufficient to require a separate substation. As the concentration of the load increases in areas fed by such a system, it is found that the system has several inherent limitations and disadvantages. For example, the enormous fluctuation in the load cycle of the circuit and the attendant variations in the voltage of the circuit have required the use of separate buses energized at somewhat different voltages. These large voltage variations have been due largely to losses in the low voltage direct current distribution circuit itself and in the converting apparatus for changing the alternating current supply to direct current. On the other hand, in many cases it has been found impossible to decrease the voltage drop because of the fact that there was insufficient room in the underground channels for the additional copper required and that the cost of ground necessary for additional substations was prohibitive. Such a system has been found to have the additional disadvantage that in case of a fault in any of the feeder circuits supplying the several rotary converter substations the entire alternating and direct current systems tend to feed through the converting apparatus, operating as an inverter, into the alternating current fault, which, in some cases, causes such disturbance in the voltage and frequency of the system as to throw the synchronous converters out of step. In many cases the elimination of the direct current distribution circuits would be highly desirable but impractical because of the enormous investment represented by the direct current apparatus installed in such areas. One of the largest single components of this investment is that represented by the elevator motors for the buildings, which may represent as much as 50 percent of the total load on the circuit.

It is an object of my invention to provide an improved system of electrical distribution which will overcome one or more of the above mentioned disadvantages and which will be simple, economical and reliable in operation.

It is another object of my invention to provide an improved system of electrical distribution suitable for supplying a highly concentrated direct current load circuit in which the voltage drop in the circuit may be maintained within predetermined narrow limits.

It is a further object of my invention to provide an improved system of electrical distribution suitable for supplying a highly concentrated direct current load circuit in which, in case of a fault on one of the circuits feeding the load circuit, reverse current energy will not flow from the direct current load circuit into the fault.

In accordance with one embodiment of my invention, an independent high voltage alternating current feeder circuit interconnects the generating station with the synchronous converter substation, and is adapted to supply energy to an electric valve converter, the direct current circuit of which is also connected to the direct current load circuit. This electric valve converter is preferably provided with means to limit its output to a predetermined value, the synchronous converter already provided in such a substation serving to supply only the excess of load required by the circuit over the fixed base load supplied by the valve converter. In some cases it also may be desirable to extend the low voltage alternating current distribution circuit to the substation and to parallel certain portions of the direct current distribution circuit and thus supplement it with respect to universal loads such as illumination, heating devices, etc.

For a better understanding of my invention together with other and further objects thereof, reference is had to the following description taken in connection with the accompanying drawing and its scope will be pointed out in the appended claims. The single figure of the accompanying drawing illustrates diagrammatically one embodiment of my invention as applied to a distribution system for energizing a highly concentrated direct current load circuit.

Referring now to the drawing, I have illustrated an arrangement for transmitting electrical energy from a pair of generating stations 10 and 11 connected through a primary alternating current distribution circuit 12 to direct current load circuits 13 and 14. Each of the generating stations 10 and 11, which are shown schematically for the sake of simplicity, includes an alternating current generator 15 provided with a field winding 16 and an associated exciter 17. These two alternating current generator stations may comprise a single unit or may be remotely located with respect to one another and connected by means of the primary alternating current distribution circuit 12. A high voltage alternating current feeder circuit 18 connects a substation A to the primary circuit 12 through a transformer 20 and a circuit breaker 19 which may be of any of the several types well known in the art, such, for example, as an overload circuit breaker. Substation A may be adapted to supply the load of only the building in which it is located or it may be connected to the direct current distribution circuit 14 through the direct current circuit 13 and a circuit breaker 21. The substation A is shown as including the usual synchronous converter 22, the direct current circuit of which is connected to the direct current load circuit 13 and the alternating current circuit of which is connected to the secondary alternating current distribution circuit 23. The secondary alternating current distribution circuit 23 may be energized from the primary circuit by any suitable number of feeder circuits, there being shown by way of example two feeder circuits including respectively a transformer 24 and circuit breaker 25 and a transformer 26 and circuit breaker 27. There is also included in substation A a rectifier arrangement comprising electric valves 28 and 29 and a power transformer 30, the primary winding of which is connected to the alternating current feeder circuit 18. This rectifier arrangement is connected in the well known manner for obtaining full wave rectification. Electric valves 28 and 29 are each provided with an anode, a cathode and a control grid and may be of any of the several types well known in the art, although I prefer to use valves of the vapor electric discharge type. In case it is desired to control the output of the above described rectifier arrangement, the control grids of the valves 28 and 29 are connected to the common cathode circuit through opposite halves of the secondary winding of a grid transformer 31 and a current limiting resistor 32. Various grid control circuits known in the art may be employed for controlling the output of the rectifier arrangement in accordance with predetermined load conditions. I have shown by way of example the primary winding of the grid transformer 31 connected to be energized from a phase shifting circuit comprising a transformer 33 energized from the alternating current feeder circuit 18 and a saturable reactor 34 and resistor 35 connected across the secondary winding of the transformer. The primary winding of the grid transformer is preferably connected between the electrical midpoint of the secondary winding of transformer 33 and the junction of reactor 34 and resistor 35. Reactor 34 is provided with a two part saturating winding 36 the upper portion of which is connected in series relation in a direct current circuit of the rectifier while the lower portion is differentially connected across the direct current circuit 13 through a suitable resistor 36a. However, this improved phase shifting circuit constitutes no part of my present invention, but is disclosed and claimed in a copending application of Myron Zucker, filed April 17, 1931, Serial No. 530,878 and assigned to the same assignee as the present application. Station B, which may represent a single building or an independent substation adapted to supply direct current to the load circuits 13 and 14, includes duplicate apparatus to that contained in substation A. In this case, however, the electric valve converter is illustrated as being energized by means of an alternating current feeder circuit 37 from the secondary alternating current distribution circuit 23 rather than directly from the primary distribution circuit 12. The direct current load circuit of the substation B is also shown as being connected through a circuit breaker 21 to the direct current circuit of a substation C comprising a single synchronous converter 38 energized directly from the secondary distribution circuit 23 and supplying direct current to the load circuit 14. The substation B is illustrated as also including an alternating current circuit 39 energized from the distribution circuit 23 through an alternating current feeder circuit 40 and a transformer 41.

The operation of the above described valve rectifier arrangement will be well understood by those skilled in the art. In describing the operation of the apparatus for maintaining constant the output of the rectifier, it will be assumed that the two portions of the saturating winding 36 and the associated resistor 36a are so proportioned that the reactor 34 is completely unsaturated when the rectifier is delivering its maximum direct current output. That is, the differential saturating effect of the upper portion of the winding 36 is equal and opposite to the constant saturating effect of the lower portion of this winding. Under normal operating conditions, when the rectifier is delivering an output corresponding to the base load at which it is designed to operate, the saturation of the reactor 34 may be such that the grid potentials of electric valves 28 and 29 lag their respective anode potentials by approximately 90 electrical degree. In case the resistance of the load circuit 13 tends to decrease due to an increase in the load on the circuit, the rectifier arrangement will tend to deliver an increased direct current. However, an increase in the direct current circuit of the rectifier will increase the differential saturating current of the winding 36 and thus increase the reactance of reactor 34 to retard the phase of the grid potentials of the valves 28 and 29. These valves then become conducting at later points in their respective half cycles of positive anode potential to reduce the average voltage of the output of the rectifier and thus maintain its current output substantially constant. Obviously, with a decrease in the load on the circuit 13, that is with an increase in its resistance, the reverse operation will take place.

In considering the operation of the apparatus as a whole, it will be assumed that, for example, the valve converting apparatus located in the stations A and B are each adjusted to maintain a base load of 300 kw. If the load demand of the building associated with substation A or the load devices immediately connected thereto exceeds this base load of 300 kw. the excess energy will be supplied by the synchronous converter 22. If the load on the substation A is just equal to the 300 kw. the synchronous converter 22 will merely float on the line, while if the load on substation A is less than the 300 kw. the difference between this load and the 300 kw. supplied by the rectifier arrangement will be delivered through the receiving circuit 13 and the circuit breaker 21 to the direct current distribution network 14.

In the case of a fault on the alternating current feeder circuit 18, no energy can flow from the direct current network 14 and the circuit 13 back into the alternating current fault because of the unilateral conductivity characteristics of the valves 28 and 29. Another feature of this arrangement is that in case of a failure in the feeder circuit supplying the synchronous converter, the alternating current feeder circuit 18 and the associated rectifier arrangement will not be overloaded but will continue to supply its base load at a reduced voltage, thus aiding in picking up the load on the direct current network system, which becomes a serious problem in case it should become completely deenergized.

The operation of the apparatus included in the substation B is very similar to that associated in substation A with the exception that in this case a portion of the universal load associated with the substation is supplied by means of the alternating current feeder circuit 40 and the alternating current circuit 39.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:—

1. In a system of distribution, an alternating current generating station, a substation including a synchronous converter, a transmission circuit for interconnecting said generating station and said substation, a direct current load circuit connected to be energized from said synchronous converter, a static converter including an electric valve connected locally to energize said direct current load circuit, and a second transmission circuit for interconnecting said static converter and said generating station.

2. In a system of distribution, an alternating current generating station, a direct current load circuit, a static converter connected locally to said direct current circuit for supplying the base load to said direct current load circuit, a transmission circuit for energizing said static converter, a synchronous converter connected to said direct current load circuit and arranged to furnish to said load circuit any power demand in excess of the power furnished by said static converter, and a second transmission circuit for interconnecting said generating station and said synchronous converter.

3. In a system of distribution, an alternating current generating station, a substation including a synchronous converter, a transmission circuit for interconnecting said generating station and said substation, a direct current load circuit connected to be energized from said synchronous converter, a static converter including an electric valve connected locally to energize said direct current load circuit, means for maintaining constant the current output of said static converter, and a second transmission circuit for interconnecting said static converter and said generating stations.

4. In a system of distribution, an alternating current generating station, a substation including a synchronous converter, a transmission circuit for interconnecting said generating station and said substation, a direct current load circuit connected to be energized from said synchronous converter, a static converter connected locally to energize said direct current load circuits, said static converter including an electric valve provided with a control grid, means for controlling the phase relation of the potential of said grid in accordance with the output of said static converter to maintain said output constant, and a second transmission circuit for interconnecting said static converter and said generating station.

5. In a system of distribution, an alternating current generating station, a concentrated direct current load circuit, a substation connected locally to said load circuit and including an electric valve converter and a synchronous converter, a pair of transmission circuits interconnecting said generating station to said converters, a third transmission circuit interconnecting said generating station and said load circuit, a synchronous converter substation interposed in said last mentioned transmission circuit at a point intermediate said generating station and said load circuit, and an alternating current load circuit connected to said first mentioned substation, said alternating current load circuit being connected with said generating station.

In witness whereof, I have hereunto set my hand.

CHARLES W. STONE.